Aug. 2, 1932.	L. BLOCH	1,870,089
WASTE PIPE FITTING
Filed May 6, 1931	3 Sheets-Sheet 1
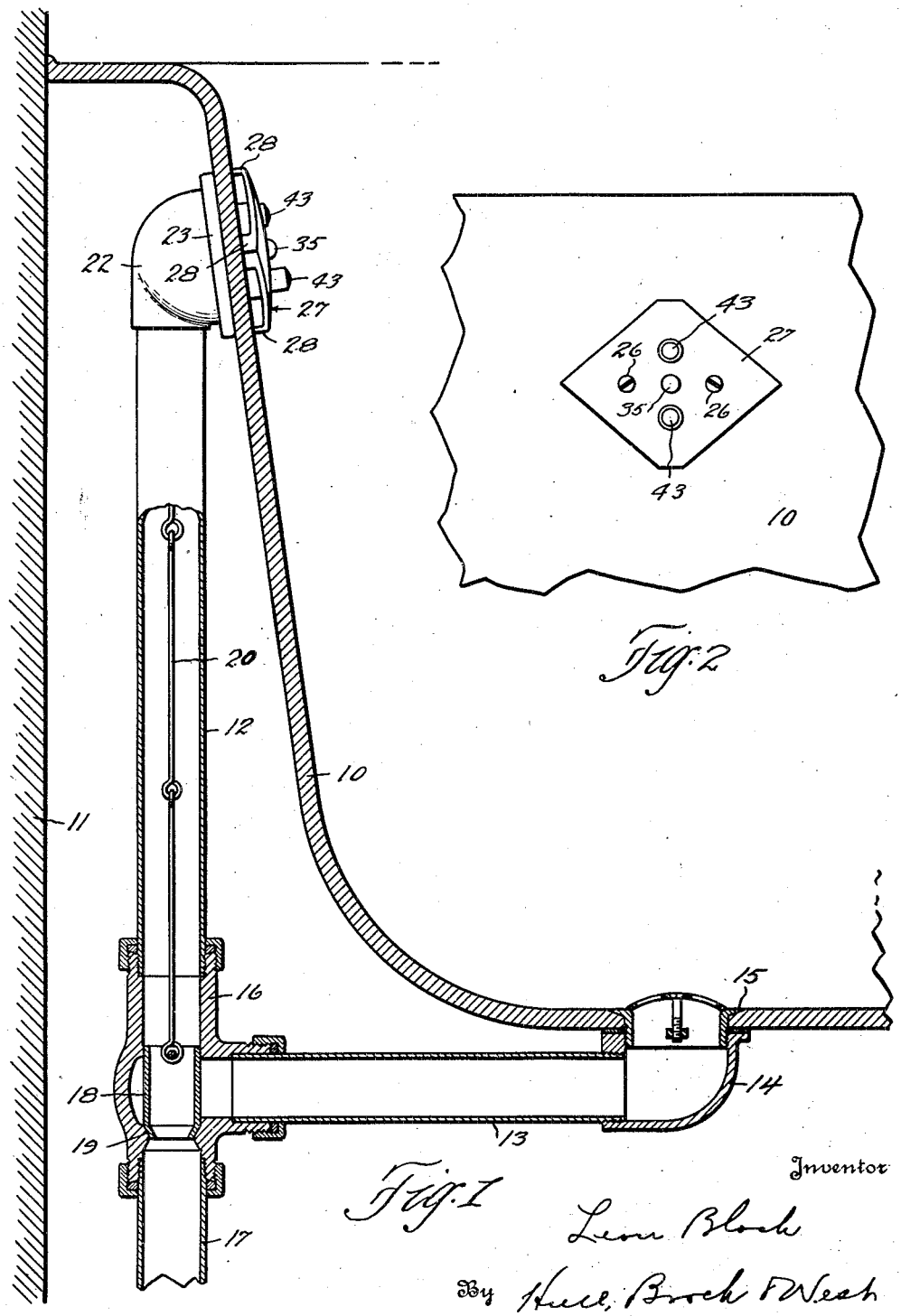

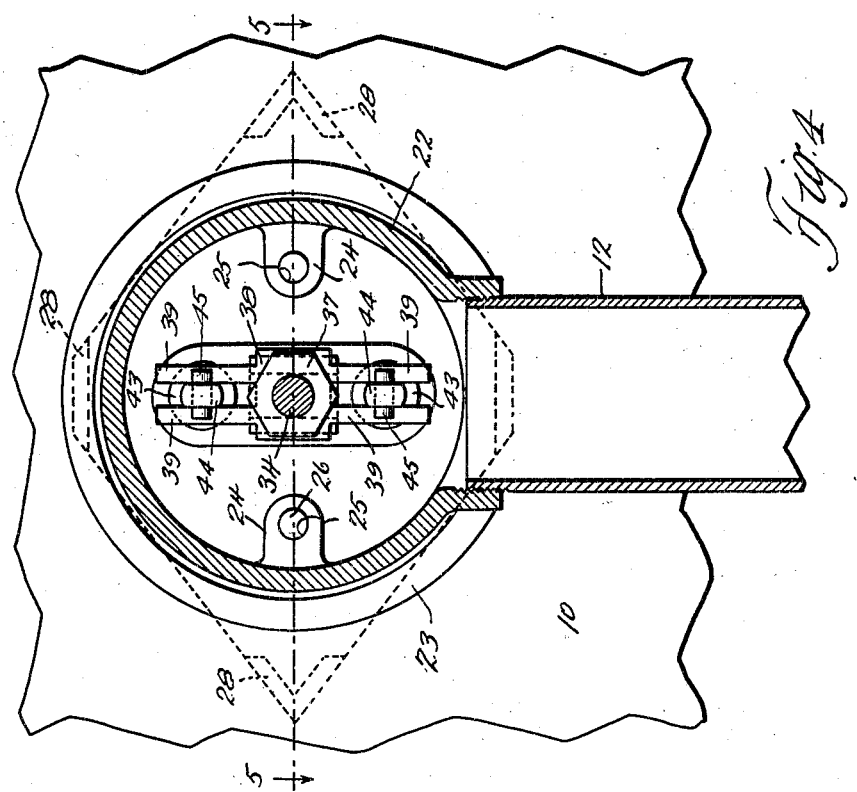
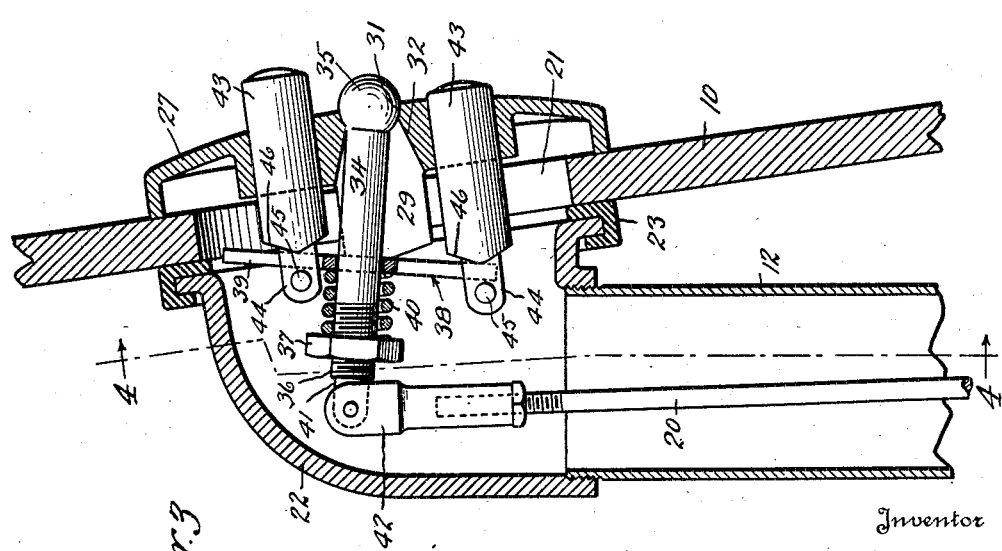

Aug. 2, 1932.    L. BLOCH    1,870,089
WASTE PIPE FITTING
Filed May 6, 1931    3 Sheets-Sheet 3
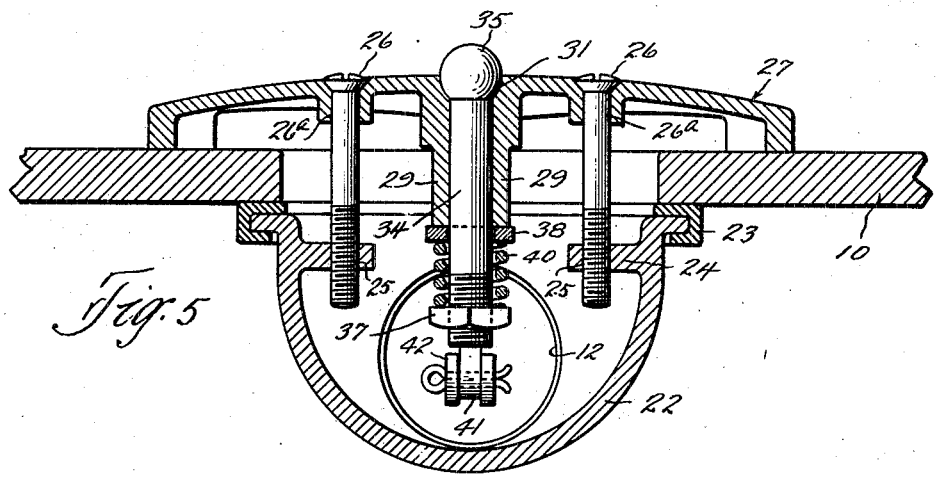
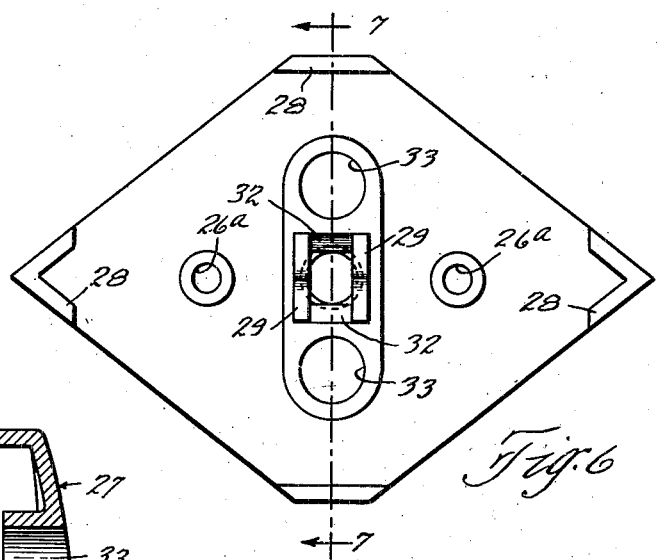
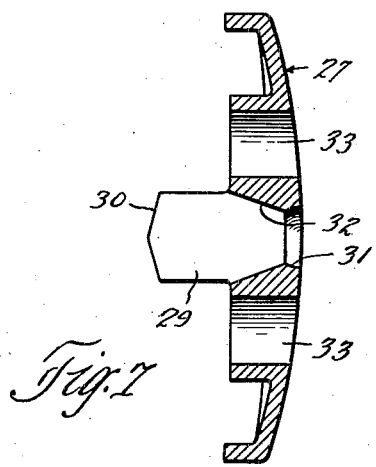
Inventor
Leon Bloch Patented Aug. 2, 1932

1,870,089

UNITED STATES PATENT OFFICE

LEON BLOCH, OF CLEVELAND HEIGHTS, OHIO

WASTE PIPE FITTING

Application filed May 6, 1931. Serial No. 535,492.

This invention relates to a fixture adapted particularly for use in connection with a bathtub but susceptible of use in other similar connections.

The principal object of my invention is to provide in a system of the character illustrated a positively acting valve controlling mechanism which shall be simple in construction, convenient in operation and which shall embody a number of improved features in details of construction.

With the foregoing and other and more limited objects in view, the invention consists in the improved features of construction and arrangement of parts as hereinafter described and claimed.

Fig. 1 is a sectional view showing an installation of one embodiment of my invention; Fig. 2 is an elevation of the escutcheon plate which carries the valve control; Fig. 3 is a detail vertical section taken centrally through the valve control mechanism; Fig. 4 is a view corresponding substantially to a section on the line 4—4 of Fig. 3; Fig. 5 is a section on line 5—5 of Fig. 4; Fig. 6 is a rear elevation of the escutcheon plate; and Fig. 7 is a section on line 7—7 of Fig. 6.

In Fig. 1 I have illustrated a portion of a bathtub 10 of usual construction placed against a wall 11 for conservation of space as is the usual procedure. Between the upright wall of the bathtub 10 and the wall 11 extends the overflow pipe 12 while underneath the floor of the bathtub 10 extends the waste pipe 13. The waste pipe 13 connects by means of an elbow 14 and bushing 15 through the opening in the bottom of the bathtub in the usual manner.

The usual T connection 16 communicates with the pipes 12 and 13 and affords an escape through the waste pipe 17. The connection 16 also carries a cylindrical valve 18 open at both ends and cooperating with the seat 19 and the side walls of the upper portion of the connection 16 to cut off the flow of water between pipes 13 and 17 while allowing overflow from the pipe 12 into the pipe 17. A chain 20 connects the valve 18 with the valve controlling means mounted at the upper end of the overflow pipe 12.

The upper end of the overflow pipe 12 is connected in covering relation to an opening 21 in the bathtub 10 by means of an elbow 22 and gasket 23. The elbow 22 is provided with lugs 24 having threaded portions 25 adapted to receive screws 26. An escutcheon plate 27 is adapted to engage the opposite side of the bathtub 10 and is provided with a pair of openings 26ª adapted to receive the screws 26 whereby to clamp the elbow 22 and gasket 23 in sealing relation over the opening 21. The escutcheon plate 27 may be provided with openings to permit the water to pass through the opening 21 but is preferably provided with an interrupted flange as indicated at 28 which spaces said plate from the wall 10 whereby to allow the passage of water thereunder into the pipe 12.

The escutcheon plate 27 is provided with a pair of parallel spaced projections 29 each of which has a double beveled end portion as indicated at 30. The plate 27 is provided with an opening extending therethrough and positioned between the projections 29. This opening comprises a part-spherical socket 31 adjacent the front of the plate 27 and a flaring portion 32 extending backwardly from the socket 31. Above and below the projections 29 are cylindrical openings 33 adapted to receive push buttons as hereinafter described. Extending through the opening between the projections 29 is a valve control bolt 34 provided with a spherical head 35 adapted to seat in the socket 31. The bolt 34 is threaded as shown at 36 and provided with a nut 37. Loosely received on the bolt 34 is an overcentering plate 38 provided with parallel projections 39 at the two sides thereof. A spring 40 is compressed between the nut 37 and the plate 38. A projection 41 on the bolt 34 provides means for a connection to the member 42 into which is threaded the uppermost link of the chain member 20. Extending through the openings 33 are push buttons 43 provided with extensions 44 adapted to extend between the projections 39 and provided with cross pins 45 adapted to engage the rear surface of the projections 39. Shoulders 46 on the buttons 43 are adapted to engage the front faces of the projections 39.

It is obvious that the perpendicular distance from the center of rotation of the bolt 34 in the socket 31 to the two beveled faces of the projections 29 is less than the distance from such center to the point of intersection of such faces. It follows that the bolt 34 and mechanism carried thereby will be in stable equilibrium when the bolt axis is perpendicular to one of the beveled faces. Pressure on the buttons 43 will tend to rotate the overcentering plate 38 about the point of intersection of the beveled faces of the projection 29 and will also tend to rotate the bolt 34 and mechanism carried thereby in the socket 31. These provide tendencies to produce a control which can be "snapped" to its positions of stable equilibrium with remarkable little exertion while affording very considerable valve operating force. With the mechanism illustrated it is possible to provide a spring of quite considerable strength without causing the operation to require undue exertion.

From the foregoing it will be evident that I have provided a fixture for bathtubs which is well adapted for its intended purpose. While I have shown the preferred embodiment, I wish it understood that I am not limited to the details thereof except in accordance with the scope of the appended claims and the prior art.

Having thus described my invention, what I claim is:

1. A plumbing fixture including, an escutcheon plate, a pair of projections extending from one side thereof and having a double bevel end portion, and elongated control member pivoted between said projections, an overcentering plate slidable longitudinally of said member, a spring on said member urging said plate into engagement with said projections whereby to secure an overcentering effect, and means for moving said member about its pivot point.

2. A plumbing fixture including, an escutcheon plate, a pair of projections extending from one side thereof and each having a double bevel end portion, an elongated control member pivoted between said projections, an overcentering plate slidable longitudinally of said member, a spring on said member urging said plate into engagement with said projections whereby to secure an overcentering effect and a pair of push buttons engaging said plate for moving said member about its pivot point.

3. A plumbing fixture including, an escutcheon plate, a pair of projections extending from one side thereof and each having a double bevel end portion, an elongated control member pivoted between said projections, an overcentering plate slidable longitudinally of said member, a spring on said member urging said plate into engagement with said projections whereby to secure an overcentering effect, and a pair of push buttons extending through said escutcheon plate and engaging said plate for moving said member about its pivot point.

4. A plumbing fixture including, an escutcheon plate, a projection thereon, a control member pivoted adjacent said projection, an overcentering plate on said control member, spring means urging said plate toward said projection, and means engaging the ends of said overcentering plate for rotating said control member.

5. A plumbing fixture including, an escutcheon plate, a projection thereon, a control member pivoted adjacent said projection, an overcentering plate on said control member, spring means urging said plate toward said projection, and a pair of push buttons engaging the ends of said overcentering plate for rotating said control member.

6. A plumbing fixture including, an escutcheon plate, a projection thereon, a control member pivoted adjacent said projection, an overcentering plate on said control member, spring means urging said plate toward said projection, and a pair of push buttons extending through said escutcheon plate and engaging the ends of said overcentering plate for rotating said control member.

7. A bathtub fixture including, an escutcheon plate, a projection thereon having a double beveled end, a bolt pivoted adjacent said projection, an overcentering plate provided with an opening receiving said bolt, spring means urging said overcentering plate into engagement with said projection, and means for rotating said bolt about its pivot point.

8. A bathtub fixture including, an escutcheon plate, a projection thereon having a double beveled end, a bolt pivoted adjacent said projection, an overcentering plate provided with an opening receiving said bolt, spring means urging said overcentering plate into engagement with said projection, and means for rotating said bolt about its pivot point, said opening being of such size as to allow pivoting of said overcentering plate with respect to said bolt over the end of said projection.

9. A bathtub fixture including, an escutcheon plate, a projection thereon having a double beveled end, a bolt pivoted adjacent said projection, an overcentering plate provided with an opening receiving said bolt, spring means urging said overcentering plate into engagement with said projection, and means for rotating said bolt about its pivot point, said opening being of such size as to allow pivoting of said overcentering plate with respect to said bolt over the end of said projection, and said last means including a pair of push buttons passing through said escutcheon plate and connected with said overcentering plate.

10. A fixture for a bathtub including, an escutcheon plate, a double beveled projection on the rear face thereof, a central opening through said plate formed to provide a socket on the front face and flaring toward said rear face, a valve control bolt extending through said opening and having a head fitting into said socket, an overcentering plate loosely carried by said bolt, spring means urging said overcentering plate into engagement with said projection, and means for actuating said overcentering plate to engage one or the other of the bevel surfaces of said projection whereby to operate said bolt from one of its positions of stable equilibrium to the other.

In testimony whereof, I hereunto affix my signature.

LEON BLOCH.